(12) United States Patent
Hausdorf et al.

(10) Patent No.: US 8,870,992 B2
(45) Date of Patent: Oct. 28, 2014

(54) FILTER

(75) Inventors: Juergen Hausdorf, Otterstadt (DE); Konrad Otto, Schwetzingen (DE)

(73) Assignee: Robert Bosch GmbH, Stuttgart (DE)

( * ) Notice: Subject to any disclaimer, the term of this patent is extended or adjusted under 35 U.S.C. 154(b) by 408 days.

(21) Appl. No.: 13/320,268

(22) PCT Filed: May 12, 2010

(86) PCT No.: PCT/EP2010/002923
§ 371 (c)(1),
(2), (4) Date: Jan. 30, 2012

(87) PCT Pub. No.: WO2010/130430
PCT Pub. Date: Nov. 18, 2010

(65) Prior Publication Data
US 2012/0137642 A1    Jun. 7, 2012

(30) Foreign Application Priority Data

May 14, 2009  (DE) .......................... 10 2009 021 420
Aug. 17, 2009  (DE) .......................... 10 2009 037 736

(51) Int. Cl.
| | | |
|---|---|---|
| *B01D 51/00* | (2006.01) |
| *B01D 46/00* | (2006.01) |
| *B01D 29/90* | (2006.01) |
| *B01D 29/15* | (2006.01) |

(52) U.S. Cl.
CPC ............ *B01D 29/15* (2013.01); *B01D 46/0046* (2013.01); *B01D 29/904* (2013.01); *B01D 29/908* (2013.01)
USPC ................... 55/418; 55/419; 55/337; 55/447; 55/448; 55/449

(58) Field of Classification Search
CPC ........ B01D 46/10; B01D 45/08; B01D 29/15; B01D 29/908; F02M 35/022
USPC ......... 55/418, 447–449, 337; 210/338, 416.5, 210/440
See application file for complete search history.

(56) References Cited

U.S. PATENT DOCUMENTS 1,822,006 A    9/1931  Bull
4,113,618 A *  9/1978  Koseki et al. ................. 210/798
(Continued)

FOREIGN PATENT DOCUMENTS

DE    43 10 492    10/1994
EP    0 318 993    6/1989
(Continued)

OTHER PUBLICATIONS

International Search Report corresponding to PCT Application No. PCT/EP2010/002923, mailed Sep. 9, 2010 (German and English language document) (7 pages).

*Primary Examiner* — Robert Clemente
*Assistant Examiner* — Karla Hawkins
(74) *Attorney, Agent, or Firm* — Maginot, Moore & Beck

(57) ABSTRACT

A filter for precipitating solid materials from a pressure medium or a gas includes an inlet and an outlet channel implemented in a filter housing. A filter element is disposed in the filter housing. Pressure medium flows through an outer surface of the filter element by means of the inlet channel into an interior area, and from the area to the outlet channel. The outer surface of the filter element, together with an inner surface of the filter housing, delimits an inlet chamber in which the pressure medium encompasses the filter element. The inlet channel and/or the inlet chamber are thereby embodied such that a centrifugal force acting approximately radially to the filter housing acts on the medium flowing into the inlet chamber, whereby the particles can be filtered out of the pressure medium in addition to the filter element.

9 Claims, 5 Drawing Sheets

(56) References Cited

U.S. PATENT DOCUMENTS

| | | |
|---|---|---|
| 4,298,465 A | 11/1981 | Druffel |
| 2002/0134725 A1* | 9/2002 | Smith et al. .................. 210/338 |

FOREIGN PATENT DOCUMENTS

| | | |
|---|---|---|
| FR | 2 629 371 | 10/1989 |
| WO | 03/059821 | 7/2003 |

* cited by examiner

FILTER

This application is a 35 U.S.C. §371 National Stage Application of PCT/EP2010/002923, filed on May 12, 2010, which claims the benefit of priority to German Application Serial No. DE 10 2009 021 420.8, filed on May 14, 2009 and German Application Serial No. DE 10 2009 037 736.0 filed on Aug. 17, 2009.

BACKGROUND

The disclosure relates to a filter, in particular a hydraulic filter.

A filter of this kind is disclosed in DE 43 10 492 A1. This filter has a pot-shaped filter housing, into which an approximately hollow cylindrical filter element is inserted. The filter housing is closed by a filter head, wherein the filter element is fixed between a housing base and the filter head, for instance. An inlet port having an inlet channel and an outlet port having an outlet channel are introduced into the filter head. The inlet channel opens into an inlet chamber delimited by an outer surface of the filter element and the filter housing, from which chamber pressure medium to be filtered flows approximately radially into the filter element. The outlet channel is connected to an interior delimited by an inner surface of the filter element, from which interior the filtered pressure medium flows via the outlet channel to the outlet port. To connect the inlet port and the inlet chamber, the inlet channel is of approximately right-angled design.

This solution has the disadvantage that a filter of this kind has a short service life owing to rapid contamination by filtered substances.

Given this situation, it is the underlying object of the disclosure to provide a filter which is characterized by a long service life.

This object is achieved by a filter having the features of patent claim 1.

SUMMARY

According to the disclosure, a filter, in particular a hydraulic filter, for precipitating solid particles from a medium, in particular a pressure medium or a gas, has a filter housing, which has an inlet channel and an outlet channel. A filter element is disposed in the filter housing. A direction of flow of the medium from an outer surface to an interior of the filter element, said interior being connected to the outlet channel, is provided. The outer surface, together with the filter housing, delimits an inlet chamber, which is connected to the inlet channel. The inlet channel and/or the inlet chamber are designed in such a way that a centrifugal force acting approximately in a direction away from the filter element acts on the medium flowing into the inlet chamber and on the solid particles.

This solution has the advantage that there is a better flow around the filter element owing to a tangential acceleration of the medium or pressure medium, thereby enabling the particles to be filtered out more uniformly by the filter element and avoiding particle residues on one side of the filter element. Moreover, particles in the pressure medium can be filtered out of said medium by means of the centrifugal force, independently of the filter element.

The filter housing is preferably of approximately pot-shaped design and the filter element is of approximately hollow cylindrical design, wherein both components are disposed approximately coaxially with respect to one another and to a longitudinal axis of the filter. This makes it possible for the pressure medium to flow around the filter element with little turbulence in the flow.

It is advantageous if a filter head closes the filter housing at the end. The inlet channel and the outlet channel are then simply formed in the filter head.

The inlet channel preferably has an oblique channel section extending obliquely to a longitudinal axis of the filter and opening approximately between the filter element and the filter housing, thereby ensuring that the pressure medium flowing through said oblique channel section is accelerated tangentially to the filter element and then moves onward in a spiral around the filter element and into the inlet chamber along the longitudinal axis of the filter.

One simple possibility is for the inlet channel to have a radial channel section adjacent to the oblique channel section, which radial channel section extends radially with respect to the longitudinal axis of the filter and is connected to an inlet port, and to have another, longitudinal channel section, which extends approximately parallel to the longitudinal axis of the filter and opens into the filter housing. The longitudinal channel section enables pressure medium to flow into the inlet chamber, preferably in addition to that in the oblique channel section, thereby allowing a high pressure medium throughput through the filter with a very low flow resistance.

As a development of the disclosure a flow guiding element, in the longitudinal channel section for instance, is designed in such a way that pressure medium flowing over the flow guiding element is guided approximately in a direction toward the oblique channel section. This has the advantage that the tangential acceleration in the oblique channel section is assisted by the flow guiding element.

A housing base of the filter housing, said base lying opposite the filter head, is preferably of concave design in order to collect the particles moved to the housing base by the centrifugal force and the flow force of the pressure medium.

To remove the particles accumulated in the concavely formed housing base of the filter housing, a base opening that can be closed by means of a stopper element and through which said particles can be removed during filter maintenance, for example, is provided in the vertex region of the housing base.

It is advantageous if the filter is an inline filter or duplex filter.

Other advantageous developments of the disclosure form the subject matter of further dependent claims.

BRIEF DESCRIPTION OF THE DRAWINGS

A preferred embodiment of the disclosure is explained in detail below with reference to schematic drawings, in which.

DETAILED DESCRIPTION

Figure 1:
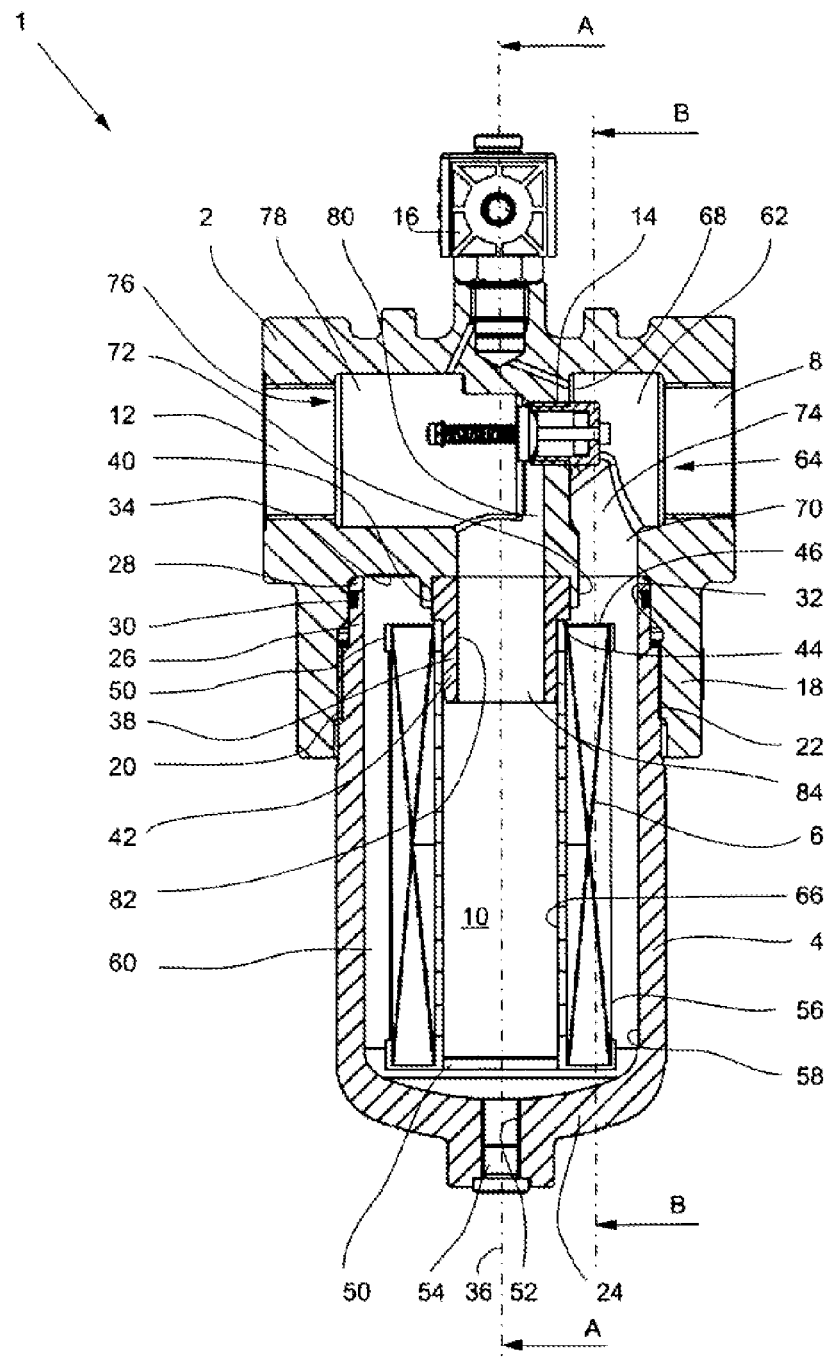
FIG. 1 shows a full section through a filter in accordance with one embodiment.

A filter in the form of a hydraulic inline filter 1 is shown in FIG. 1 in a full section view. Inline filters 1 of this kind are disposed directly downstream of a hydraulic pump, for example, and filter an entire pressure medium volume flow of this hydraulic pump. This is then a full flow filter. Inline filters 1 of this kind can also be disposed in a hydraulic subcircuit upstream of a sensitive hydraulic device.

The inline filter 1 has a filter head 2, into which a pot-shaped filter housing 4 is screwed. An approximately hollow cylindrical filter element 6 is accommodated in said housing. Pressure medium flows via an inlet port 8 formed in the filter head 2 to the filter element 6, through the latter and, from an interior 10 of the filter element 6, to an outlet port 12, which is likewise formed in the filter head 2. Disposed between the ports 8, 12 between the ports 8, 12 is a pressure valve 14, which opens at a particular pressure difference between the ports 8 and 12. A soiling indication element 16 is screwed into the filter head 2 at the top in FIG. 1.

The filter head 2 has a hollow cylindrical collar 18, which extends downward in FIG. 1, for instance, and is intended to receive the filter housing 4. An internal thread 20 is formed centrally on an inner side of the collar 18. This thread is in engagement with an external thread 22 made on the filter housing 4. This thread is formed approximately centrally with respect to an end section 26 of the filter housing 4 remote from a housing base 24. The end section 26 of the filter housing 4 ends with a sealing region 28 which is set back radially in stages from the outside and in which a sealing ring 30 is inserted. Together with the sealing ring 30, the sealing region 28 rests in a sealing manner against an inner sealing region 32 of the collar 18, wherein the inner sealing region 32 has a smaller diameter than the internal thread 20. The depth to which the filter housing 4 is screwed into the filter head 2 is limited by the base surface 34 of the collar 18.

An approximately hollow cylindrical holding element 38 surrounded by the collar 18 is retained on the base surface 34 of the filter head 2 approximately coaxially with respect to a longitudinal axis 36 of the filter. For retention, a holding flange 40 projecting from the base surface 34 of the filter head 2 and surrounding the holding element 38 is provided. In an end section 42 facing the filter element 6, the holding element 38 is stepped back radially and thereby forms a stop shoulder 44, which likewise faces the filter element 6. The approximately hollow cylindrical filter element 6 is then pushed onto the end section 48 of the holding element 38 and rests by means of an end 46 against the stop shoulder 44 of the holding element 38, for instance. The filter element 6 is closed by means of a cap element 50 at the end section 48 remote from the end 46 and at the end 46.

The end section 48, together with the cap element 50 of the filter element 6, is spaced apart somewhat from the housing base 24 of the filter housing 4. The housing base 24 of the filter housing 4 is of concave design, thereby enabling solids or particles, for example, to collect in this region. A through hole 52, which can be closed by means of a stopper element 54, e.g. a screw, is made in the housing base 24, approximately coaxially with respect to the longitudinal axis 36 of the filter. Particles accumulated in the concave housing base 24 can thus be removed easily via the through hole 52 without having to remove the entire inline filter 1.

An outer circumferential surface or outer surface of the filter element 6, together with an inner surface 58 of the filter housing 4, delimits an inlet chamber 60, via which pressure medium can flow around the filter element 6.

The inlet port and the outlet port 8, 12 are formed in the filter head 2 approximately perpendicularly to the longitudinal axis 36 of the filter. The inlet port 8 opens into a radially widened radial channel section 62 of an inlet channel 64, said section being formed coaxially with respect to the inlet port 8. The depth of the radial channel section 62 corresponds approximately to a difference between an internal radius of the filter housing 4 and an internal radius of an inner circumferential surface or inner surface 66 delimiting the interior 10 of the filter element 6. The radial channel section 62 ends with a channel end surface 68 approximately at the same radial level as the inner surface 66 of the filter element 6.

A longitudinal channel section 70 of the inlet channel 64 branches radially from the radial channel section 62 in the direction of the inlet chamber 60 and, in FIG. 1, opens into the filter housing 4 above the end 46 of the filter element 6. A part of the longitudinal channel section 70 is formed approximately flush with the inner surface 58 of the filter housing 4 and an outer circumferential surface 72 of the holding flange 40.

Branching off from the radial channel section 62 in addition to the longitudinal channel section 70 is an oblique channel section 74 intended to provide an additional pressure medium connection between the inlet port 8 and the inlet chamber 60. The oblique channel section 74 extends approximately around a circle segment with an external radius of the holding flange 40 and opens into the inlet chamber 60 in the region which is not visible in FIG. 1, between the holding flange 40 and the inner surface 58 of the filter housing 4.

The outlet port 12 is made in the filter head 2 approximately diametrically opposite the inlet port 8 and is connected to the interior 10 of the filter element 6 by an outlet channel 76. The outlet channel 76 has a radial channel connection 78, which extends approximately coaxially with respect to the outlet port 12 and extends beyond the longitudinal axis 36 into the filter head 2. Branching off from the radial channel connection 78 toward the filter element 6, approximately coaxially with respect to the longitudinal axis 36 of the filter, is a longitudinal channel section 80 which extends as far as the base surface 34 of the filter head 2 and merges approximately flush into a connecting channel 84, which is delimited by an inner wall 82 of the holding element and opens, in turn, into the interior 10 of the filter element 6. The connecting channel 84 is likewise disposed approximately coaxially with respect to the longitudinal axis 36.

Figure 2:
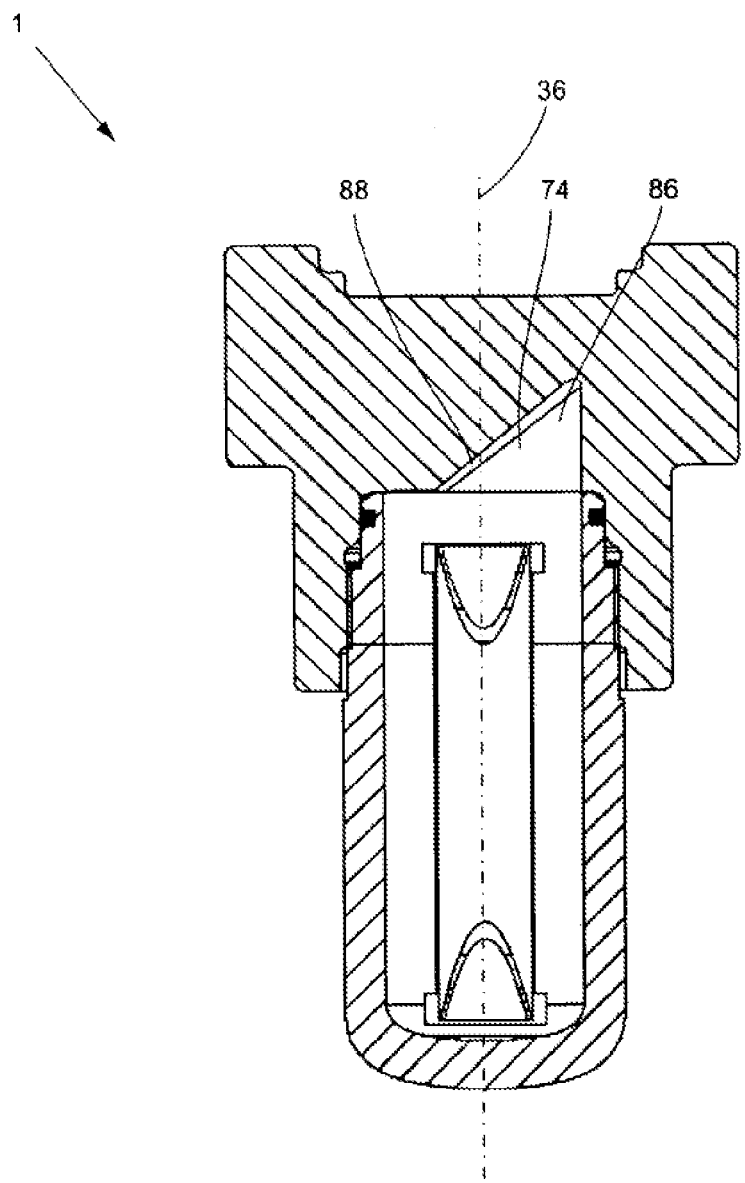
FIG. 2 shows a longitudinal section through the filter parallel to the full section from FIG. 1.

FIG. 2 shows a longitudinal section through the inline filter 1, wherein a section plane of the longitudinal section is approximately parallel to the section plane of the full section in FIG. 1 and passes through the oblique channel section 74 of the inlet channel 64 approximately centrally. FIG. 2 thus shows a radially outer side wall section 86 of the oblique channel section 74. In the projection area, looking into the plane of the drawing in FIG. 2, the side wall section 86 has an approximately triangular shape. A hypotenuse or long side 88 is set substantially at an angle of 45° to the longitudinal axis 36 of the filter. The side wall section 86 is formed approximately so as to run around a circle with the internal radius of the inner surface 58 in FIG. 1, runs around about a quarter of this circle and, in doing so, is formed approximately flush with the inner surface 58 of the filter housing 4.

Figure 3:
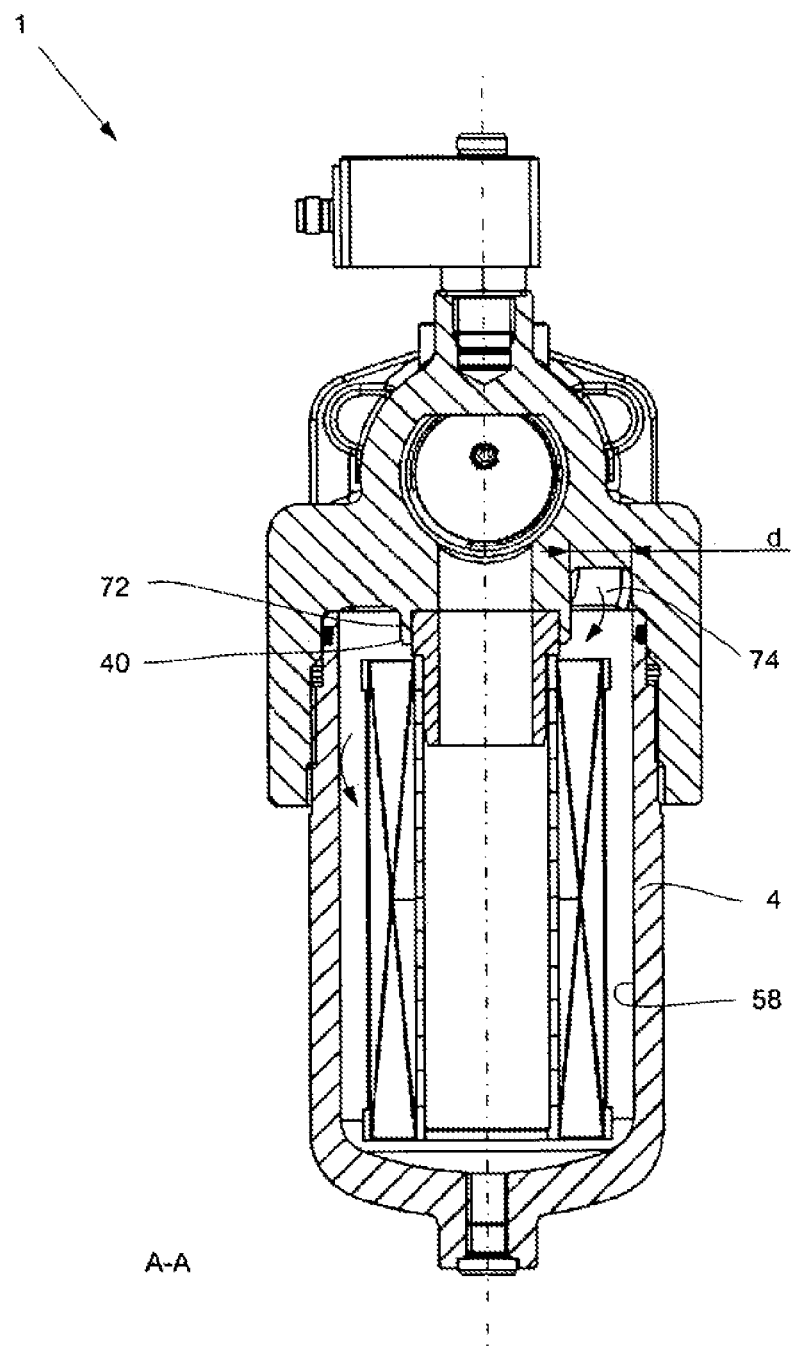
FIG. 3 shows a full section through the filter offset by 90° to the plane of the drawing in FIG. 1.

FIG. 3 shows another full section through the inline filter 1 along section line A-A in FIG. 1. In this case, the oblique channel section 74 is shown in a cross section. A width d of the oblique channel section 74 corresponds approximately to the radial spacing between the inner surface 58 of the filter housing 4 and the outer circumferential surface 72 of the holding flange 40.

Figure 4:
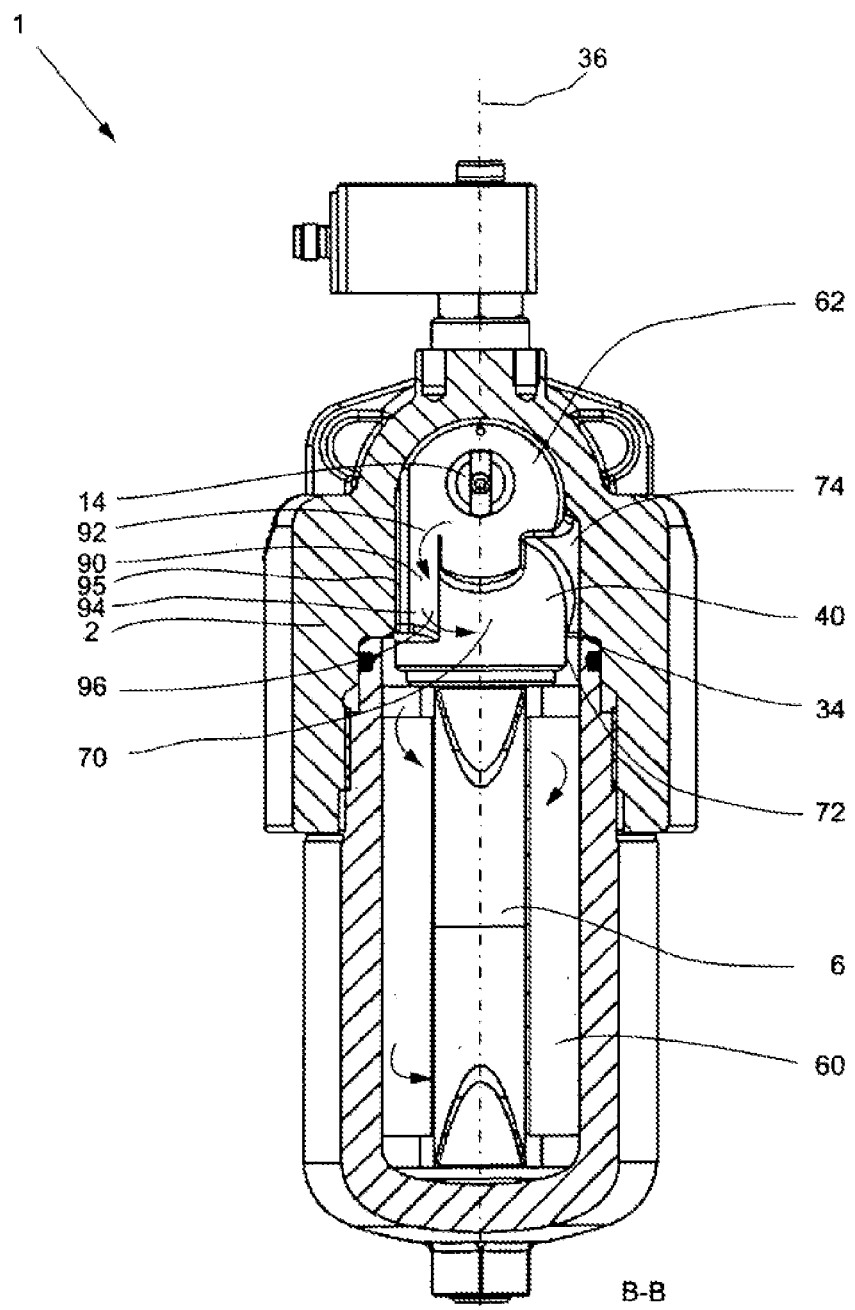
FIG. 4 shows a longitudinal section through the filter parallel to the full section from FIG. 3.

FIG. 4 shows a longitudinal section along section line B-B in FIG. 1. In this case, the radial channel section 62 is shown in a cross section. The oblique channel section 74 branches off from the pressure valve 14 at the bottom and on the right (see FIG. 4) and runs along the outer circumferential surface 72 of the holding flange 40 as far as the base surface 34 of the filter head 2. The configuration of the inlet 60 or the oblique channel section 74 can be achieved by means of the shape and/or by means of inserts. In this longitudinal section in FIG. 4, the longitudinal channel section 70 is furthermore shown in cross section. This has a width which corresponds substantially to the diameter of the radial channel section 62, for instance.

A flow guiding element 90 is formed between channel sections 62 and 70. This element extends approximately parallel to the longitudinal axis 36 of the filter and is formed with an element section 92, at the top in FIG. 4, in the region of the radial channel section 62 and runs as far as a lower element section 94 in a left hand side region 95 of the longitudinal channel section 70. The flow guiding element 90 is of substantially ramp-shaped configuration, wherein a ramp surface 96 is set at an angle to the plane of the drawing in FIG. 4 in such a way that a stream of pressure medium flowing into the plane of the drawing is deflected by the ramp surface 96 in the direction of the oblique channel section 74. In the direction of the longitudinal axis 36 of the filter, the flow guiding element 90 ends approximately at the base surface 34 of the filter head 2 and has a width which corresponds approximately to that of the oblique channel section 74, which can be seen in FIG. 3.

The operation of the inline filter 1 will now be explained with reference to FIGS. 1 to 4.

To enable pressure medium to be filtered, said pressure medium flows via the inlet port 8 into the radial channel section 62 in FIG. 1 and, via the latter, into the longitudinal channel section 70, on the one hand, and into the oblique channel section 74, on the other hand. By means of the oblique channel section 74, some of the pressure medium is accelerated in the tangential direction in addition to the acceleration in the direction of the longitudinal axis 36 of the filter and, as a result, a circulatory motion around the filter element 6 is imparted to the pressure medium as it enters the inlet chamber 60 from the oblique channel section 74. The tangential motion of the pressure medium is assisted by the ramp surface 96 of the flow guiding element 90 in FIG. 4, which deflects the pressure medium approximately in accordance with the arrows shown in FIG. 4 toward the oblique channel section 74. The pressure medium, which thus performs an approximately helical circulatory motion in the inlet chamber 60, flows onward via the outer surface 56 of the filter element 6 in FIG. 1, through the latter and, via the inner surface 66, passes into the interior 10 of the filter element 6, wherein solid particles are substantially filtered out by the filter element 6. The pressure medium then flows onward from the interior 10, via the connecting channel 84, to the outlet channel 76 and to the outlet port 12.

Owing to the circulatory motion of the pressure medium, a centrifugal force in a direction toward the inner surface 58 of the filter housing 4 acts on the solid particles entrained in said pressure medium. The solid particles are then moved in the direction of the inner surface 58 by the centrifugal force and then migrate with the downward-circulating pressure medium in FIG. 1 to the concave housing base 24, where they are then deposited. Deposited particles can be removed from the inline filter 1 by opening the through hole 52. By virtue of this circulatory motion of the pressure medium, a significant portion of the particles to be filtered is thus not filtered out of the pressure medium by the filter element 6 but by the centrifugal force, thereby leading the service life of the filter element 6, which soils more slowly in comparison with the prior art.

Moreover, the tangential acceleration of the pressure medium by the oblique channel section 74 and the flow guiding element 90 makes the flow of pressure medium around the filter element 6 more uniform, thereby avoiding soiling of the filter element 6 on one side.

Figure 5:
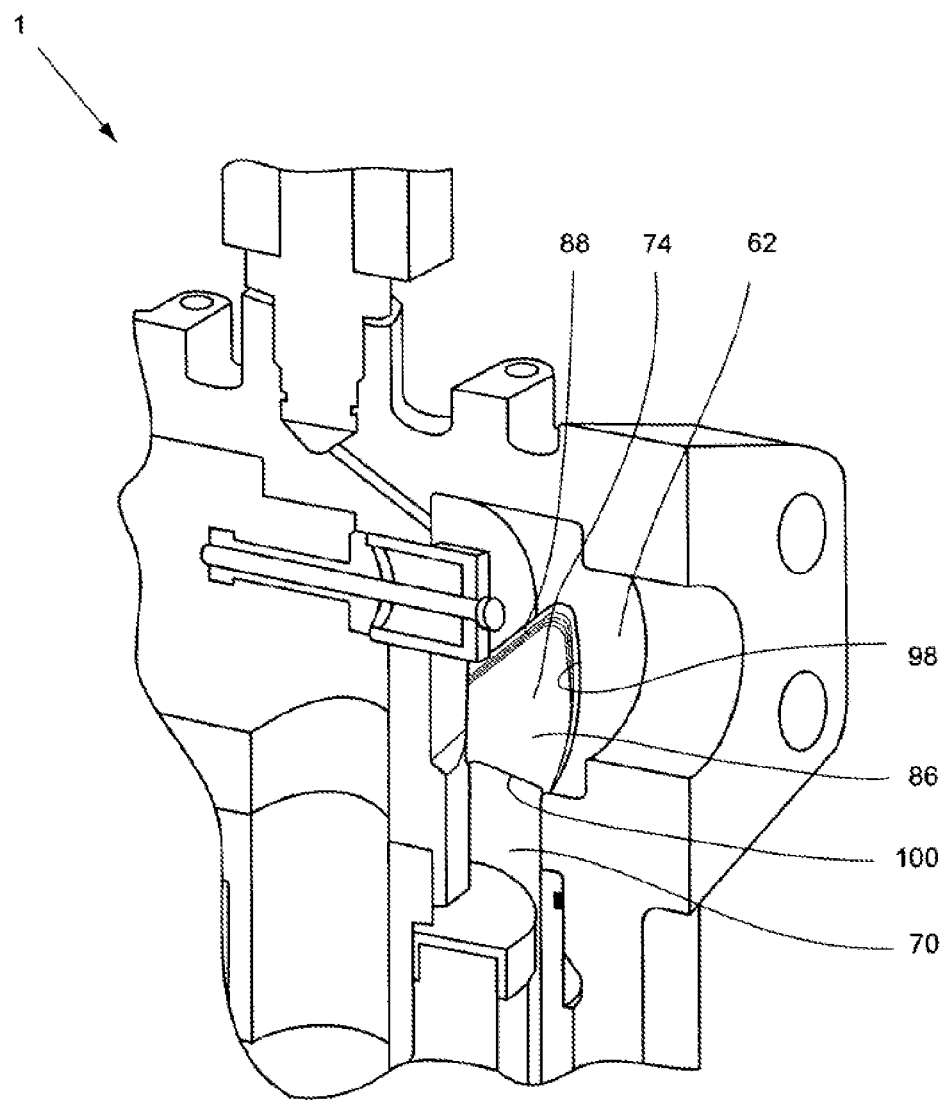
FIG. 5 shows a perspective sectioned view of the filter.

FIG. 5 illustrates a section of the filter element 1 in FIG. 1 in a perspective sectional view. The triangular side wall section 86 of the oblique channel section 74 can be seen here. This wall section branches off from the radial channel section 62 at approximately the same radial level as the longitudinal channel section 70. As can be seen from FIG. 5, the oblique channel section 74 is designed with the oblique long side 88, with a transverse side 98 extending approximately in the longitudinal direction of the inline filter 1 and with a bottom side 100 open toward the filter housing 4. The long side 88 and the transverse side 98 are rounded concavely toward the side wall section 86 in order to allow flow through the oblique channel section 74 with little turbulence in the flow.

The configuration of the inlet 60 and/or of the oblique channel section 74 can be achieved by means of the shape and/or by means of inserts (filters).

A filter for precipitating solids from a pressure medium or a gas is disclosed. This filter has an inlet channel and an outlet channel, which are formed in a filter housing. A filter element is disposed in the filter housing. Pressure medium flows via the inlet channel, through an outer surface of the filter element, into an interior and, from the latter, to the outlet channel. The outer surface of the filter element, together with an inner surface of the filter housing, delimits an inlet chamber, in which the pressure medium surrounds the filter element. The inlet channel and/or the inlet chamber are designed in such a way that a centrifugal force acting approximately radially with respect to the filter housing acts on the medium flowing in in the inlet chamber, thereby providing a means of filtering the particles out of the pressure medium in addition to the filter element.

LIST OF REFERENCE SIGNS 1 inline filter
2 filter head
4 filter housing
6 filter element
8 inlet port
10 interior
12 outlet port
14 pressure valve
16 soiling indication element
18 collar
20 internal thread
22 external thread
24 housing base
26 end section
28 sealing region
30 sealing ring
32 inner sealing region
34 base surface
36 longitudinal axis of the filter
38 holding element
40 holding flange
42 end section
44 stop shoulder
46 end
48 end section
50 cap element
52 through hole
54 stopper element
56 outer surface
58 inner surface 60 inlet chamber
62 radial channel section
64 inlet channel
66 inner surface
68 channel end surface
70 longitudinal channel section
72 outer circumferential surface
74 oblique channel section
76 outlet channel
78 radial channel connection
80 longitudinal channel section
82 inner wall
84 connecting channel
86 side wall section
88 long side
90 flow guiding element
92 upper element section
94 lower element section
95 side region
96 ramp surface
98 transverse side
100 bottom side

The invention claimed is:

1. A hydraulic filter for precipitating solid particles from a medium comprising:
    a filter housing, including a filter head closing the filter housing at an end, the filter head defining an inlet channel and an outlet channel; and
    a filter element disposed within said filter housing,
    wherein a direction of flow of the medium is provided from an outer surface to an interior of the filter element, said interior being connected to the outlet channel,
    wherein the outer surface, together with the filter housing, delimits an inlet chamber connected to the inlet channel,
    wherein the inlet channel and the inlet chamber are designed in such a way that a centrifugal force acting approximately in a direction toward the filter housing acts on the medium flowing into the inlet chamber and on the solid particles,
    wherein the inlet channel has an oblique channel section extending obliquely to the longitudinal axis of the filter and opening approximately between the filter element and the filter housing,
    wherein the inlet channel has a radial channel section adjacent to the oblique channel section,
    wherein the radial channel section extends radially with respect to a longitudinal axis of the filter and is connected to an inlet port, and
    wherein the inlet channel has a longitudinal channel section adjacent the oblique channel section extending approximately parallel to the longitudinal axis of the filter and opening into the filter housing.

2. The filter as claimed in claim 1, wherein:
    the filter housing is of approximately pot-shaped design,
    the filter element is of approximately hollow cylindrical design, and
    the filter housing and the filter element are disposed approximately coaxially with respect to one another and to the longitudinal axis of the filter.

3. The filter as claimed in claim 1, wherein a flow guiding element, which guides a medium flowing over it in the direction of the oblique channel section, is disposed in the longitudinal channel section.

4. The filter as claimed in claim 1, wherein:
    a housing base of the filter housing is of concave design, and
    said base is positioned opposite said filter head.

5. The filter as claimed in claim 4, wherein, approximately in a vertex region, the housing base of the filter housing has a through hole configured to be closed by a stopper element.

6. The filter as claimed in claim 1, wherein said filter is an inline filter or a duplex filter.

7. The filter as claimed in claim 1, wherein the flow path of the medium is defined from the radial channel section to the oblique channel section, to the longitudinal channel, and into the filter housing.

8. The filter as claimed in claim 1, wherein the longitudinal channel section is defined in less than half of a circumference of the filter head.

9. The filter as claimed in claim 1, wherein the longitudinal channel section is parallel to the longitudinal axis of the filter.

* * * * *